US008516018B1

(12) United States Patent
Foote et al.

(10) Patent No.: US 8,516,018 B1
(45) Date of Patent: Aug. 20, 2013

(54) BUDGETING NATIVE RESOURCES IN RESOURCE-CONSTRAINED DEVICES THAT EMPLOY A DYNAMIC, GARBAGE-COLLECTION BASED VIEW ARCHITECTURE

(75) Inventors: William Foote, El Cerrito, CA (US); Alejandro Nijamkin, Simi Valley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/441,499

(22) Filed: Apr. 6, 2012

Related U.S. Application Data

(60) Provisional application No. 61/604,439, filed on Feb. 28, 2012.

(51) Int. Cl.
*G06F 12/00* (2006.01)
*G06F 17/30* (2006.01)

(52) U.S. Cl.
USPC .......................................... 707/813; 707/816

(58) Field of Classification Search
None
See application file for complete search history.

(56) References Cited

U.S. PATENT DOCUMENTS

| 6,584,548 | B1 * | 6/2003 | Bourne et al. | 711/134 |
| 6,640,240 | B1 * | 10/2003 | Hoffman et al. | 709/203 |
| 6,671,424 | B1 * | 12/2003 | Skoll et al. | 382/305 |
| 7,555,638 | B2 | 6/2009 | Li et al. | |
| 7,583,457 | B2 | 9/2009 | Miller et al. | |
| 7,873,909 | B2 | 1/2011 | Evans | |
| 2007/0013708 | A1 * | 1/2007 | Barcklay et al. | 345/557 |
| 2007/0118550 | A1 | 5/2007 | Yang et al. | |

FOREIGN PATENT DOCUMENTS

EP 1821213 A1 * 8/2007

OTHER PUBLICATIONS

Gavalas et al., "Development Platforms for Mobile Applications: Status and Trends", IEEE Software, vol. 23, issue 1, pp. 77-86 , Jan.-Feb. 2011, IEEE.*
Ehringer, "The Dalvik Virtual Machine Architecture", Technical Repor, Mar. 2010.*
C. A. Cois, "Android Development Tutorial: Asynchronous Lazy Loading and Caching of ListView Images", Jun. 15, 2011, Codehenge.net, available at http://codehenge.net/blog/2011/06/android-development-tutorial-asynchronous-lazy-loading-and-caching-of-listview-images/ (last visited Apr. 6, 2012).

(Continued)

*Primary Examiner* — Michael Hicks
(74) *Attorney, Agent, or Firm* — McDonnell Boehnen Hulbert & Berghoff LLP

(57) ABSTRACT

Disclosed are apparatus and methods for managing image storage. An image source of a computing device can include one or more functions and a reference to image views for an image object, such as a bitmap object. The image object can include a reference to first storage that stores an image. The image source, the reference to the image views, and the image object are stored in a managed portion of memory. The first storage is stored in an unmanaged portion of memory differing from the managed portion. The computing device displays the image. Upon determining to discontinue displaying the image, an unbind function of the image source is called. The image source responsively discontinues display of the image. The image source receives an indication that the image views are solely weakly referenced. In response to the indication, the image source deallocates the first storage.

20 Claims, 9 Drawing Sheets

(56) References Cited

OTHER PUBLICATIONS

Toxi, "Asynchronous Data/Image Loading", Dec. 29, 2010, processing.org, available at http://wiki.processing.org/w/Asynchronous_data/image_loading (last visited Apr. 6, 2012).

M. Johnson, "HJCache: iPhone Cache Library for Asynchronous Image Loading and Caching", Jan. 11, 2011, Focused Apps, available at http://www.markj.net/hjcache-iphone-image-cache/ (last visited Apr. 6, 2012).

* cited by examiner

BUDGETING NATIVE RESOURCES IN RESOURCE-CONSTRAINED DEVICES THAT EMPLOY A DYNAMIC, GARBAGE-COLLECTION BASED VIEW ARCHITECTURE

CROSS-REFERENCE TO RELATED APPLICATIONS

This application claims priority to U.S. Patent App. No. 61/604,439, filed Feb. 28, 2012, entitled "Budgeting Native Resources in Resource-Constrained Devices that Employ a Dynamic, Garbage-Collection Based View Architecture", which is incorporated herein by reference for all purposes.

BACKGROUND

Unless otherwise indicated herein, the materials described in this section are not prior art to the claims in this application and are not admitted to be prior art by inclusion in this section.

Modern operating systems can provide interfaces for various portions of a user interface. For example, typical operating systems provide support to load image, audio, and video data into memory, unload the same data from memory, and for displaying image data and/or playing audio and/or video data that is in memory. Operating system support can include specific support for image, audio, and/or video data and/or can be part of a general package for utilizing blocks of memory.

In some cases, the operating system can also provide support for memory management for executing applications. For example, the operating system can provide a run-time system, including a memory manager to support execution of software written in programming languages that frequently allocate and deallocate blocks of memory.

SUMMARY

In one aspect, a method is provided. An image source of a computing device is defined. The image source includes one or more functions and a reference to an image view for an image object. The image object includes a reference to first storage of the computing device storing an image. The image source, the reference to the image view, and the image object are stored in a managed portion of memory of the computing device. The first storage is in an unmanaged portion of memory of the computing device. The managed portion differs from the unmanaged portion. The computing device displays the image. The computing device determines whether to continue displaying the image. Upon determining to discontinue displaying the image, (i) an unbind function of the one or more functions for the image source is called and (b) in response, the image source discontinues the display of the image using the computing device and deallocates the first storage.

In a second aspect, a computing device is provided. The computing device includes a processor and data storage. The data storage includes a managed portion and an unmanaged portion. The data storage is configured to store at least an image in a first storage and to store computer-readable program instructions. The instructions are configured to, upon execution by the processor, cause the processor to perform functions including: (a) define an image source including one or more functions and a reference to an image view for an image object, where the image object includes a reference to the first storage, where the image source, the reference to the image view, and the image object are stored in the managed portion, and where the first storage is in the unmanaged portion, (b) display the image, (c) determine whether to continue displaying the image, (d) upon determining to discontinue displaying the image: (i) call an unbind function of the one or more functions for the image source and (ii) in response, the image source discontinues the display of the image and deallocates the first storage.

In a third aspect, an article of manufacture is provided. The article of manufacture includes a computer-readable storage medium having instructions stored thereon that, in response to execution by a processor, cause the processor to perform functions. The functions include: (a) define an image source including one or more functions and a reference to an image view for an image object, where the image object includes a reference to first storage storing the image, wherein the image source, the reference to the image view, and the image object are stored in a managed portion of data storage, where the first storage is stored in an unmanaged portion of the data storage, and where the managed portion differs from the unmanaged portion, (b) display the image, (c) determine whether to continue displaying the image, (d) upon determining to discontinue displaying the image: (i) call an unbind function of the one or more functions for the image source, and (ii) in response, the image source discontinues the display of the image and deallocates the first storage.

DETAILED DESCRIPTION

Overview

Figure 1:
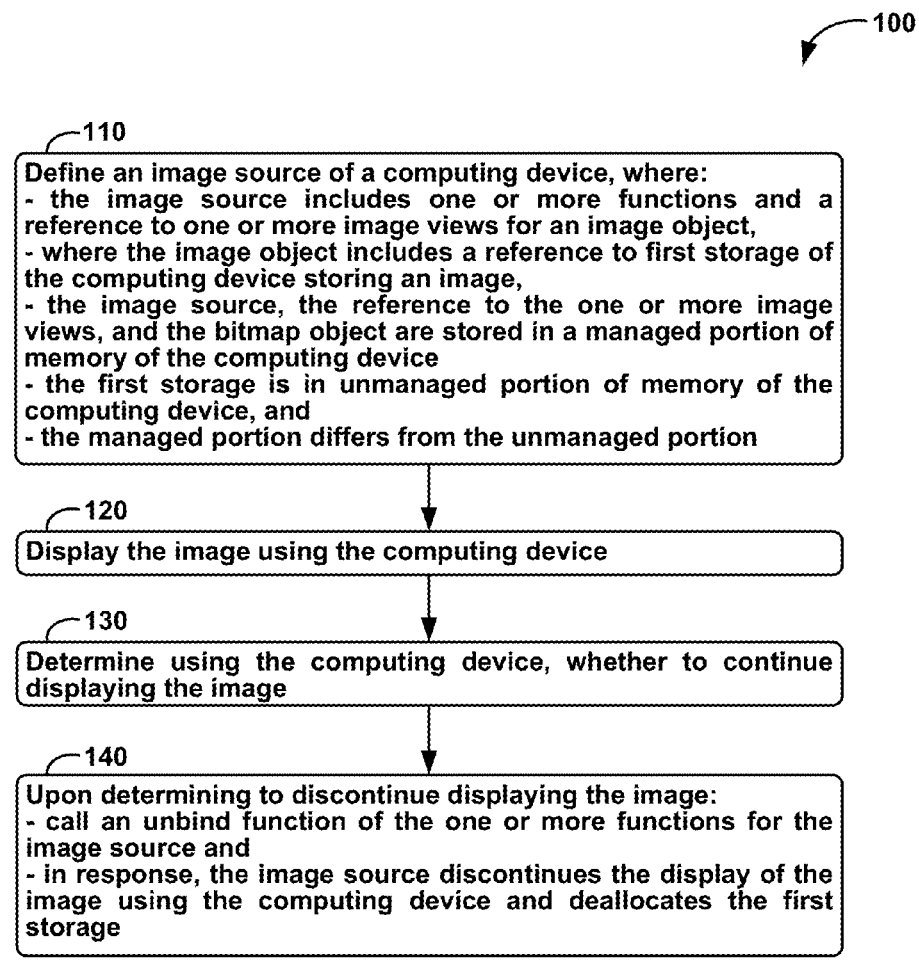
FIG. 1 is a flow chart of a method, in accordance with an example embodiment

Modern computer operating systems, such as the Android operating system used to control smart devices, can provide services for one or more software applications. Android-based applications can include one or more "activities." Each activity enables the application to provide a user interface by providing objects and other resources to display images and text and/or receive user input.

In many object-oriented environments, the objects are stored in a data structure known as a "managed heap" that permits easy dynamic memory allocation. When an object is no longer being used, it can be returned to free memory on the managed heap by a software tool called a "garbage collector" (GC) performing "garbage collection". In operation, a garbage collector can determine if an object is no longer being referenced or used, and in that case, the garbage collector can select the object for reclamation.

In object-oriented application environments, such as an Android-based application, an object can have a reference to a block of memory. For example, an example of one small object in Android is a "bitmap object". An Android bitmap object can contain a reference to a "pixmap" or block of memory that stores an image. The reference can occupy a relatively small amount of storage; e.g., less than twenty bytes. However, the pixmap can be orders of magnitude larger than the reference. For example, if the pixmap stores a graphical image that is 1024×1024 pixels in size with 32 bits to specify a color at each pixel, the pixmap can be four megabytes in size. In some embodiments, image objects, such as but not limited to bitmap objects, can refer to blocks of memory that store images.

In some embodiments, the memory for the pixmap is not allocated from the managed heap but rather from a different, perhaps unmanaged, portion of memory. As such, since no heap storage is used for the pixmap, the GC observes the pixmap as having a memory size of zero. In some embodiments, the GC might ignore a bitmap object. For example, a GC may operate by looking for large blocks of managed memory to free and reclaim all large blocks of memory, before trying to free smaller blocks of managed memory, like an instance of a bitmap object.

In these embodiments, bitmap objects referencing images not stored on the managed heap may not be frequently reclaimed by GCs. As a result, an unused bitmap object can refer to a pixmap that locks up the pixmap via the bitmap object's reference until the bitmap object is eventually reclaimed. Then, in scenarios with a relatively few unused bitmap objects holding on to large blocks of image memory, the amount of memory available for image allocation can be nearly or completely consumed, causing the application to be restarted. Restarting applications is a source of user discontent for obvious reasons.

One solution is to allocate the memory for image storage from the managed heap used to allocate memory for objects, as opposed to allocating images from unmanaged memory. Therefore, when the managed heap determines memory is running low, the memory will include image memory, making the image memory issue visible to the heap manager. The heap manager can then execute the garbage collector to find free memory. If the size of an unused bitmap object also includes the size of any allocated image memory, then the garbage collector should quickly find the unused bitmap object and reclaim that memory.

However, in some cases, image memory and managed heap memory are completely disjoint. Then, the application and/or software supporting the application can determine when objects, such as bitmap objects, are no longer being used and reclaim the bitmap objects and associated image memory.

For the case of bitmap objects in Android, a new class called "ImageSource" can be used. Each ImageSource can refer to a pixmap, or storage for an image, via a "binding" object to an "endpoint" object, such as an ImageView object that is configured to store images. The ImageSource class can define "lifecycle" methods for ImageSource creation, destruction, starting, and stopping the ImageSource. Also, the ImageSource class can have methods to "bind" an image to a view and thus make it visible, "unbind" the image when the image is no longer visible, and "preload" to get the image ready for binding. Along with ImageSources, an ImageConsumer interface can be defined for exception handling, and a one-per-application ImageManager can be used to track image memory allocation. In some cases, the ImageSource, ImageView, other endpoint objects, ImageManager, ImageConsumer, etc. can be stored in heap memory managed by the garbage collector along with all other objects used by the application, while pixmaps can be stored in unmanaged memory.

One or more ImageSource instances can be associated with an Android activity. In Android, when visibility of an activity changes, a callback method is executed to inform the activity of the change in visibility. One technique to reclaim image memory begins when a callback for an activity related to a change in visibility is called. Then, the callback can in turn call the appropriate life cycle function(s) of ImageSource(s) associated with the activity. For example, if the activity is no longer visible, an on Stop( ) callback may be called. The on Stop( ) callback can in turn invoke the stop( )method(s) for ImageSource(s) associated with the activity. The stop( )method(s) can in turn invoke unbind( ) for an ImageView referring to an image stored via the bitmap object referred to by the ImageSource object. In some embodiments, the bitmap object and underlying pixmap can be freed immediately, while in other embodiments, the bitmap object can be put on an image cache for a brief period of time in case the activity soon becomes visible. After that period of time, the bitmap object and underlying pixmap can be reclaimed.

Another technique to reclaim image memory involves use of ImageSources which contain a "weak" reference to each ImageView used to display images in the activity. When the garbage collector determines that the only references to an object are weak references, the garbage collector sends a message to the owner(s) of the weak reference(s), informing the owner(s) that the only references to the object are weak references.

In a scenario where an image is no longer used by an application, the application will not refer to a corresponding ImageView, except for the ImageSource's weak reference. In this case, the garbage collector will send the ImageSource a message that the ImageView is solely referenced by weak references. In response to the weak-reference message, the ImageSource can reclaim the unmanaged memory, if any, used by any pixmaps associated with the corresponding ImageView. Then, once the unmanaged memory is reclaimed, the ImageSource can remove the weak reference to the corresponding ImageView. Once the weak reference is removed, the garbage collector can reclaim the memory of the now-unreferenced corresponding ImageView.

This techniques discussed herein can be applicable to objects other than images stored in unmanaged memory. For example, an object in managed memory can refer to an object other than an image stored in unmanaged memory, such as video, audio, text, database, binary, and/or other type of object(s). In the event that weak reference(s) is/are the last reference(s) to the object(s) other than image(s) stored in unmanaged memory, the unmanaged memory storing the object(s) other than image(s) can be reclaimed and then the weak reference(s) can be removed.

Example Operations

Turning to the figures, FIG. 1 is a flow chart of method 100, in accordance with an example embodiment. Method 100 begins at block 110, where an image source of a computing device is defined, such as the ImageSource discussed later in the context of at least FIGS. 4-5D. The image source can include one or more functions and a reference to one or more image views for a bitmap object, such as the bitmap object discussed later in the context of at least FIGS. 4-5D. The bitmap object can include a reference to first storage of the computing device storing an image.

The image source, the reference to the image view(s), and the bitmap object can be stored in a managed portion of memory of the computing device. The first storage can be in an unmanaged portion of memory of the computing device. The managed portion can differ from the unmanaged portion, such as shown later in the context of at least FIG. 4.

In other embodiments, the managed portion of memory is configured to be managed by a garbage collector, and wherein the unmanaged portion of memory is not configured to be managed by the garbage collector.

At block 120, the computing device can display the image.

At block 130, the computing device can determine whether to continue displaying the image.

At block 140, upon determining to discontinue displaying the image: (a) an unbind function of the one or more functions for the image source can be called, and (b) in response, the image source can responsively discontinuing the display of the image using the computing device and can deallocate the first storage.

In some embodiments, method 100 additionally includes the computing device determines whether a second image is to be displayed. Upon determining that the second image is to be displayed, the computing device can: (a) allocate second storage in the unmanaged portion of memory for the second image and (b) store the second image in the second storage. A bind function of the one or more functions for the image source for the second image can be called. The image source can responsively display the second image.

In other embodiments, the one or more functions of the image source can further comprise a preload function. The preload function can be configured to allocate storage in the unmanaged portion of memory for at least the second image and to store the second image in the allocated storage. In particular embodiments, a stop function of the one or more functions for the image source can be called. In response, the second image can be responsively unbound from the image view of the second image. The unbound second image can be placed into an image cache.

In more particular embodiments, the computing device can wait a pre-determined period of time after placing the unbound second image into the image cache. During the pre-determined period of time, the computing device can determine whether the second image is to be displayed. In response to determining that the second image is to be displayed, the computing device can: (1) retrieve the second image from the image cache and (2) display the second image. In response to determining that the second image is not to be displayed, the computing device can deallocate the second storage.

In still other embodiments, the reference to the one or more image views of the image source can include a weak reference to the image view. Method 100 can additionally include: (a) after the unbind function is called, the image source can receive an indication that the one or more image views are solely weakly referenced and (b) in response to the indication, the image source can deallocate the first storage.

Example User Interface Scenario

Figure 2:
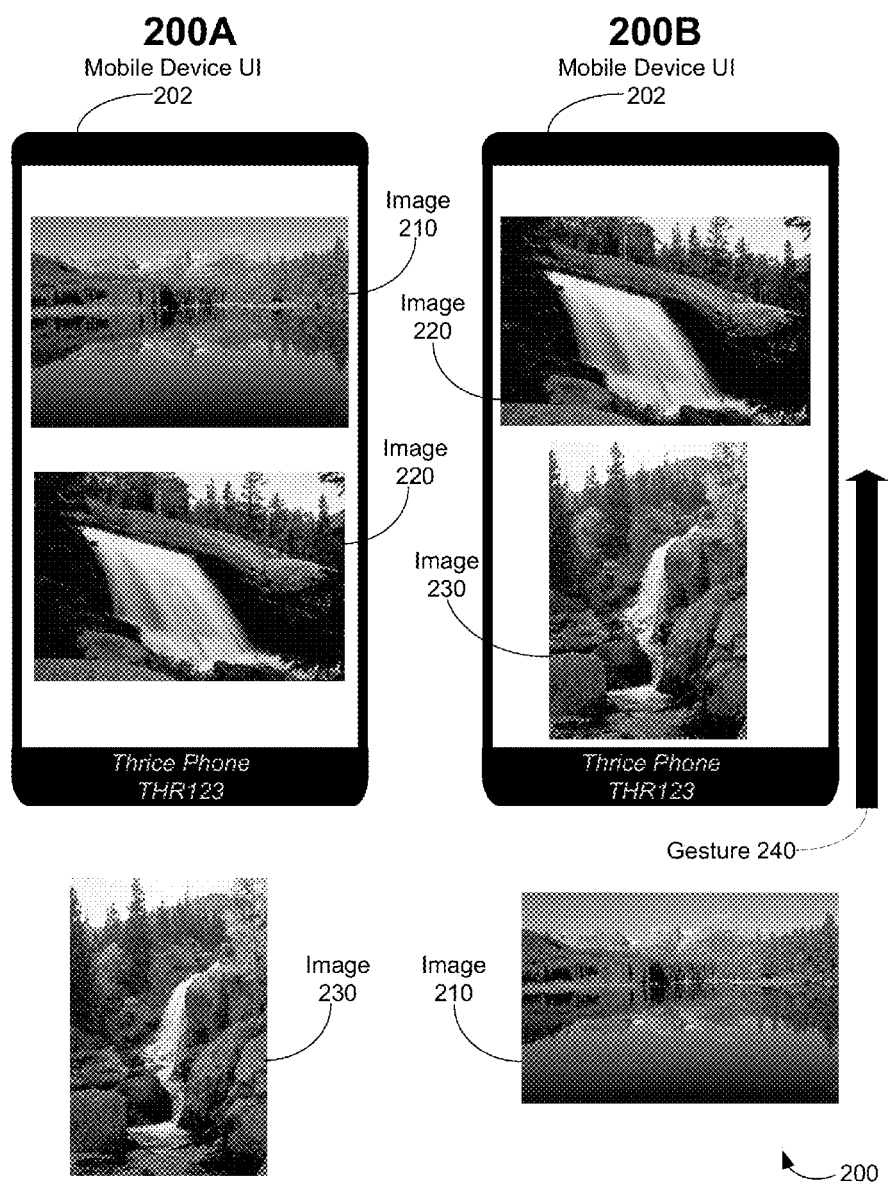
FIG. 2 shows an example mobile device user interface scenario in accordance with an example embodiment.

FIG. 2 shows mobile device user interface scenario 200 in accordance with an example embodiment. At 200A of scenario 200, mobile device user interface (UI) 202 is shown displaying two images 210 and 220 and storing, but not displaying, a third image 230.

At 200B of scenario 200, gesture 240 is received at mobile device user interface 202. Gesture 240, which is a move-up gesture, instructs mobile device interface 202 to perform the following sub-tasks in response:

1. Remove image 210 from visibility.
2. Display image 220 at the position previously held by image 210.

3. If a new image e.g., an image other than image 210 or image 220 is available, display the new image at the position previously held by image 220. If no new image is available, display image 210 at the position previously held by image 220.

FIG. 2 shows, at 200B, the resulting mobile-device user interface 202 after executing the above-mentioned subtasks. At 200B, image 210 has been removed from visibility and image 220 is shown displayed at the top of mobile device user interface 202; i.e., in the position previously held by image 210. Also at 200B, a new image, image 230, is displayed at the position previously held by image 210.

Example Software Architecture for Managing Image Memory

Figure 3:
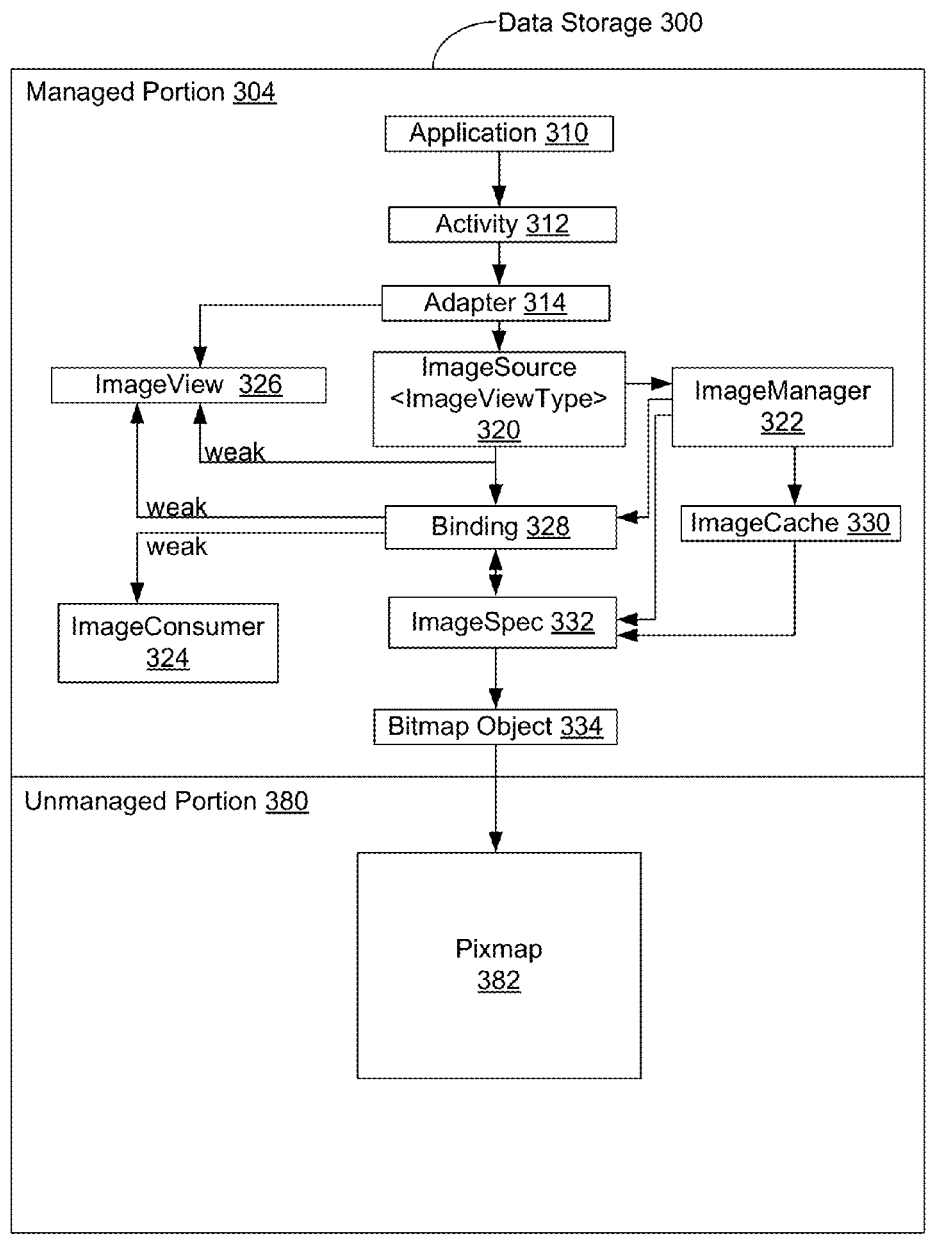
FIG. 3 shows data storage with software for managing image memory in a managed portion and an image stored in an unmanaged portion, in accordance with an example embodiment.

FIG. 3 shows example data storage 300 with software for managing image memory in managed portion 302 of data storage 300 and an image, stored as pixmap 382, in unmanaged portion 380 of data storage 300. In some embodiments, managed portion 302 is managed by a garbage collector. In specific embodiments, the functionality described herein for data storage 300 can be performed by data storage 604.

FIG. 3 shows managed portion 302 of data storage 300 with application 310, activity 312, adapter 314, image source 320, image manager 322, ImageView (IV) 326, binding 328, image cache 330, image specification 332, and bitmap object 334. FIG. 3 also shows unmanaged portion 380 with pixmap 382.

Application 310 is an instance of a software object representing a base class for a software program or "application." Activity 312 is an instance of a software object representing a single focused task to be performed. In some cases, an activity can be presented to a user via a user interface, such as a window.

In FIG. 3, arrows indicate references from a referencing item to referred-to item. For example, the arrow from application 310 to activity 312 indicates that application 310, which is the referencing item, references activity 312, which is the referred-to item. Unless specifically stated, each reference shown in FIG. 3 can refer to one or more items; continuing this example, application 310 can refer to one or more activities 312.

Adapter 314 is a software object that provides a referencing item access to data within a referred-to item. For example, activity 312 can use adapter 314 to access data within an ImageSource <ImageViewType> 320 or an ImageView 326.

ImageSource 320, ImageManager 322, ImageConsumer 324, ImageCache 330, and ImageSpec 332 are instances of software objects that together provide a utility for managing images. In some cases, such as shown in FIG. 3, the managed images are stored as bitmap objects, such as bitmap object 334. A bitmap object in turn can contain one or more reference(s) or pointer(s) to either managed memory or unmanaged memory to store image data. For example, FIG. 3 shows bitmap object 334 with a reference to pixmap 382 in unmanaged memory 380.

ImageSource 320 can be an instance of an object representing an image based on a specified type. For the example shown in FIG. 3, the specified type is ImageViewType but other types are possible as well, and ImageView 326 is of type ImageViewType. ImageSource 320 can include a reference to an object that instantiates the specified type, such as the weak reference shown from ImageSource 320 to ImageView 326 in FIG. 3.

ImageSource 320 can provide interface(s) to itself and/or to a represented image. The interface to itself can include "lifecycle" functions for ImageSource 320. The lifecycle functions can include create, destroy, start, and stop functions to respectively create, delete, start, and stop the ImageSource object. ImageSource 320 can also provide an interface with functions to manage the underlying image. These functions can include a bind( ) function to make the image visible and create the appropriate bindings between ImageSource 320 and the image, an unbind( ) function to remove the image from visibility and deleted the appropriate bindings between ImageSource 320 and the image, and a preload( ) function to get the image ready for visible display. In other embodiments, ImageSource 320 can have more or fewer functions in these interfaces and/or can include more or fewer interfaces.

ImageManager 322 can control images represented by ImageSources. For example, ImageManager 322 can track references or "bindings" to images over all activities utilized by application 310. ImageManager 322 permits multiple activities to reference images, and ensures that memory for a referenced image is not prematurely released. When ImageManager determines an image is not bound, or no longer referred to by any activity of the application, ImageManager 322 can put the image into ImageCache 330 for tracking unbound images.

In some embodiments, an image can be kept in an ImageCache 330 for at least a pre-determined period of time before image memory, such as pixmap 382, is released. Waiting for the pre-determined period of time permits another activity to bind to the previously-unbound image before the image memory is released, thus potentially saving the resources required to reload an image that will soon be bound (or bound again). In other embodiments, an image can be kept in an ImageCache 330 until some event occurs or function is performed; e.g., images are kept in ImageCache 330 until a predetermined amount of pixmap memory is allocated or a bind( ) call is made.

ImageConsumer 324 can link images with ImageSource objects and handle exceptions. For example, an ImageConsumer 324 object can include functions, e.g., on Loading( ) and on Loaded( ) to be called when an image is respectively started to be loaded into memory and finished being loaded into memory. ImageConsumer 324 can be include one or more exception handling functions to process errors returned by the operating system; e.g., an error in loading a particular image for viewing.

ImageSpec 332 can be an object that "canonically" represents a loaded image at a certain size. In this case, the "canonical" object representation is used to share the same rendered image everywhere it is viewed. By using canonical object representations, identical copies of the image will not be loaded, even if the same image rendering is viewed in two or more different places. In an example embodiment, ImageSpec 332 can include a size, image-specific parameters, a state (e.g., loading, loaded, bound, etc.), and a reference to a bitmap object, such as the reference from ImageSpec 332 to bitmap object 334 shown in FIG. 3.

Binding 328 permits decoupling of ImageSource 320, Image Consumer 324, ImageView 326, and ImageSpec 332. This decoupling permits use of an image in an ImageSpec 332 by an ImageSource 320 and ImageView 326 to be bound/viewed, by an ImageManager 322 and ImageCache 330 to potentially be released after viewing, and perhaps back to the ImageSource 320 for re-binding. In some cases, an ImageConsumer 324 can use ImageSpec 332 for exception handling as well.

FIG. 3 shows that Binding 328 and ImageSource 320 both use weak references. Binding 328 weakly references both ImageView 326 and ImageConsumer 324, and ImageSource 320 weakly references ImageView 326. During garbage collection, the garbage collector can identify a number of references to each object and reclaim each unreferenced object.

In some embodiments, the garbage collector can determine that a referred-to object is solely referenced by one or more weak references. In this case, the garbage collector can send a message to the referring object(s) informing the referring object(s) that only weak references to the referred-to object exist. After receiving the weak reference message, the referring object can perform cleanup or other activities before releasing the weak reference. For example, when an ImageSource 320 is informed that weak reference(s) to ImageView 326 is/are the last reference(s) to that ImageView 326, the ImageSource 320 can initiate the release of unmanaged memory storing a corresponding pixmap 382, perhaps by invoking a function of bitmap object 334 (e.g., bitmap.recycle( )) and then release the weak reference to ImageView 326.

FIGS. 4A-4D show an example image management scenario 400, in accordance with an example embodiment. Scenario 400 shows an example image management for carrying out a scenario closely related to scenario 200 of FIG. 2.

Scenario 400 begins at 400A with application 400 referring to activity 412, activity 412 referring to adapter 414, and adapter 414 referring to ImageSource 420. Activity 412 is also configured to refer to a window of mobile device user interface 402, shown using the dashed line in FIG. 4A. At 400A, mobile device user interface (MDUI) 402 is shown with a blank screen to indicate that application 410 has not requested display of any images.

Figure 4A:
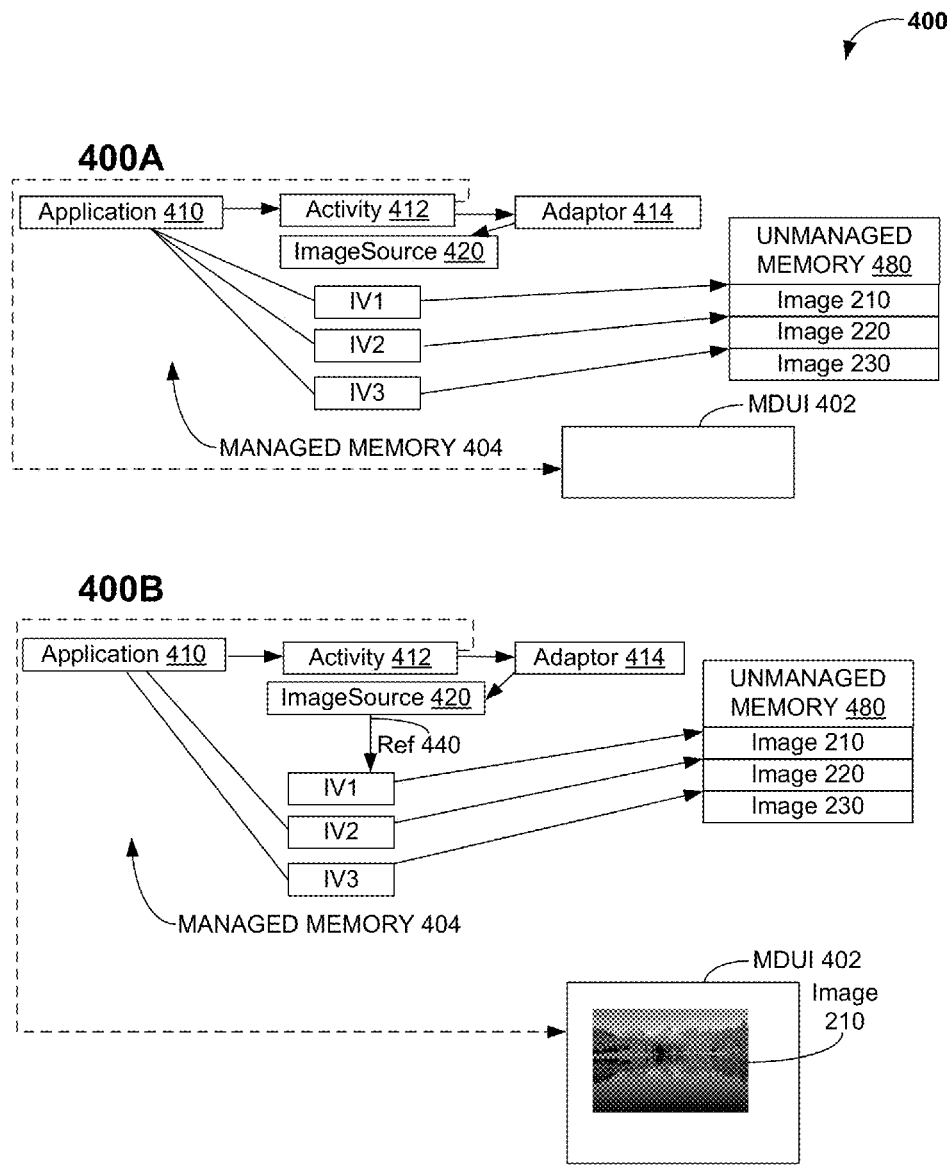
FIGS. 4A-4D show an example image management scenario in accordance with an example embodiment.

Application 410 also refers to three ImageViews (IVs): IV1, IV2, and IV3. FIG. 4A shows IV1, IV2, and IV3 each has a respective reference to respective blocks of unmanaged memory 480 that hold the images depicted respectively as images 210, 220, and 230 in FIG. 2.

FIG. 4A also shows that application 410, activity 412, adapter 414, ImageSource 420, and IVs 1-3 are all stored in managed memory 404. In embodiments not shown in FIGS. 4A-4D, additional objects, such as but not limited to adapter 414, can include references to images 210, 220, 230 stored in unmanaged memory 480.

At 400B, application 410 has requested that IV1 be bound via activity 412 to mobile device user interface 402. Application 410 can make this request by calling the ImageSource bind( ) function with IV1 as a parameter to the function. In response, ImageSource 420 generates reference 440 to IV1, which in turn refers to a block of unmanaged memory 480 storing image 210. In some embodiments, reference 440 can be or include a weak reference.

As part of the bind( ) function, image 210 is displayed in the window of mobile device user interface 402 referred to by activity 412. In response, mobile device user interface 402 displays image 210.

Figure 4B:
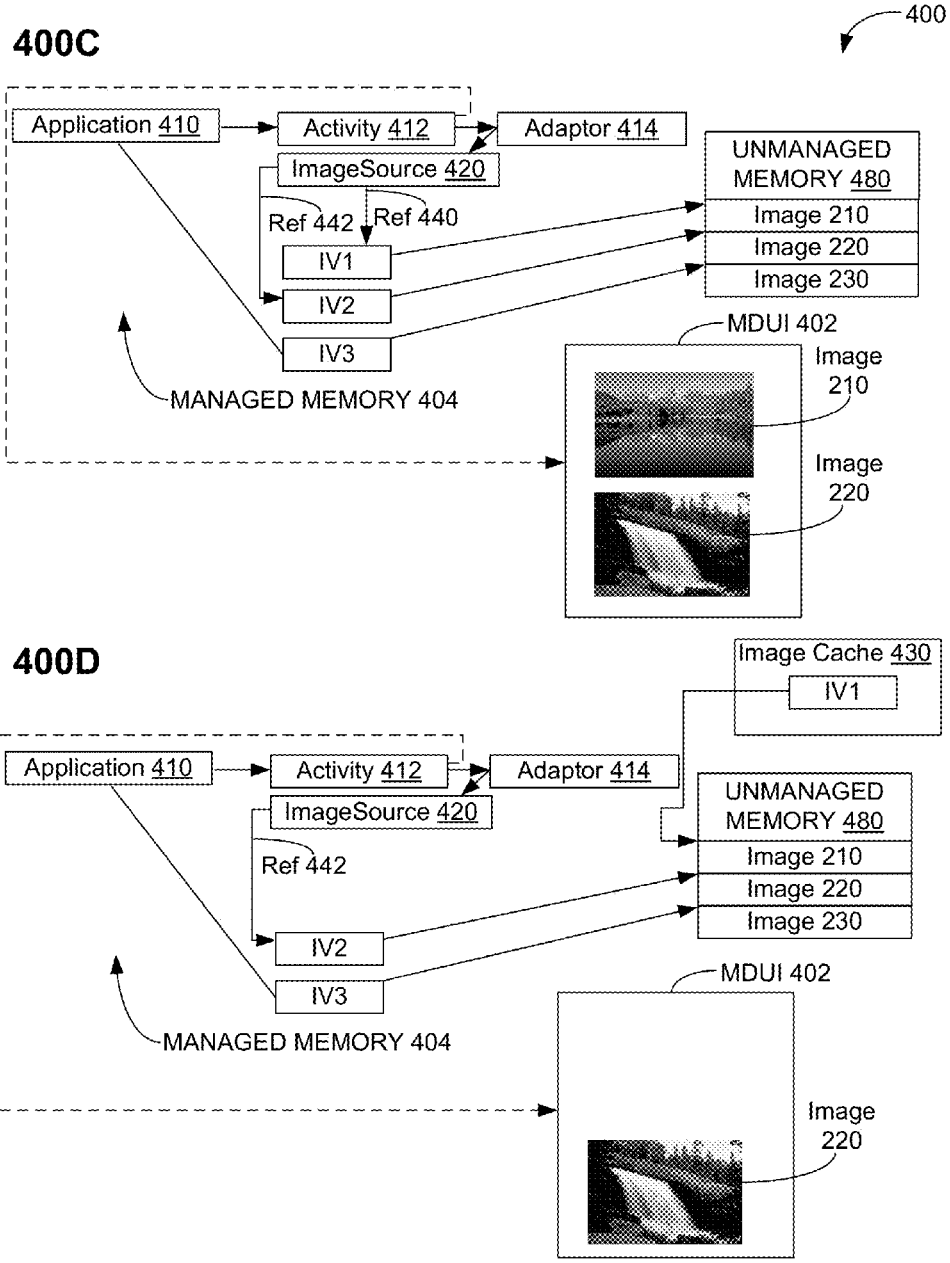

Turning to FIG. 4B at 400C, application 410 has requested that IV2 be bound via activity 412 to mobile device user interface 402. Application 410 can make this request by calling the ImageSource bind( ) function with IV2 as a parameter to the function. In response, ImageSource 420 generates reference 442 to IV2, which in turn refers to a block of unmanaged memory 480 storing image 220.

As part of the bind( ) function, image 220 is displayed in the window of mobile device user interface 402 referred to by activity 412. In response, mobile device user interface 402 displays image 220.

At 400D of FIG. 4B, activity 412 receives an indication of a move-up gesture. In response to the move-up gesture, application 410 can remove image 210 from view, move image 220 to a portion of the window of mobile device user interface 402 previously held by image 210, and then display image 230 in a portion of the window of mobile device user interface 402 previously used to display image 220.

At 400D, application 410 has requested, via activity 412, that IV1 be unbound from mobile device user interface 402. Application 410 can make this request by calling the Image-Source unbind( ) function with IV1 as a parameter to the function. In response, ImageSource 420 removes reference 440 to IV1 and mobile device user interface 402 clears the display of image 210.

In some embodiments, ImageSource 420 removes reference 440 to IV1 in response to a notification that only weak references refer to IV1. This notification to ImageSource 420 can be provided when reference 440 includes a weak reference from ImageSource 420 to IV1. A weak reference WR from a source object SO to an destination object DO is a reference that both refers to the destination object DO and, in the event that DO is solely referred to by weak references, the source object SO is informed by a memory manager (e.g., a garbage collection tool) that DO is solely or only referred to by weak references. In other embodiments, binding 428 or another object can provide a reference count or other indication of a number of references to ImageValueType1.

In response to ImageSource 420 removing reference 440, ImageSource 420 can request an ImageManager, not shown in FIGS. 4A-4D, to place IV1 in ImageCache 430 for possible memory reclamation. In response, the ImageManager can place IV1 in ImageCache 430 and start a cache timer for IV1.

Figure 4C:
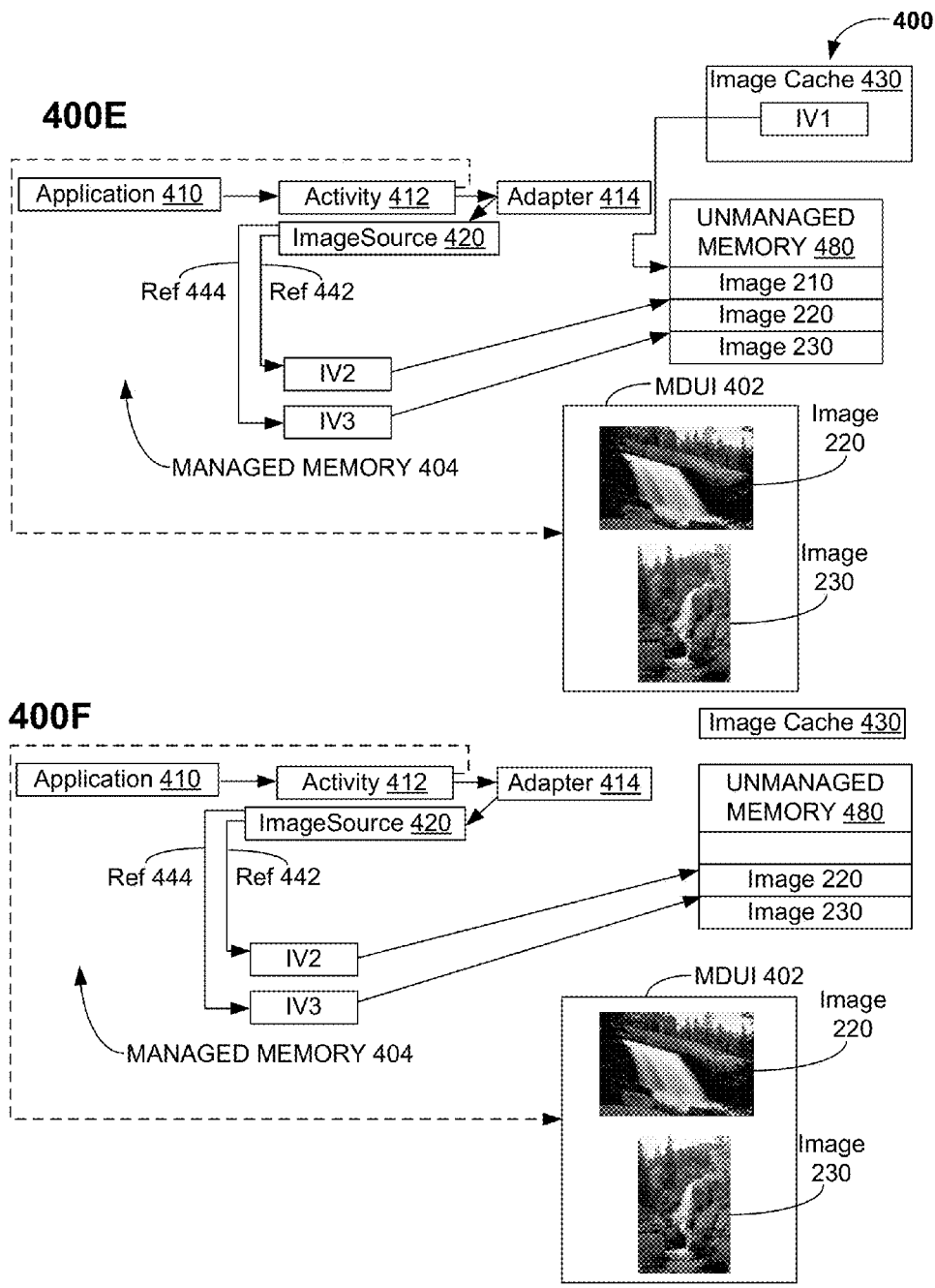

As shown at 400E of FIG. 4C, image 220 is moved to the portion of mobile device user interface 402 previously held by image 210. Also, application 410 can request that IV3 be bound to ImageSource 420 and made visible, via mobile device user interface 402. Application 410 can make this request by calling the ImageSource bind( ) function with IV3 as a parameter to the function. In response, ImageSource 420 generates reference 444 to IV3, which in turn refers to a block of unmanaged memory 480 storing image 230. Then, image 230 is displayed in the portion of mobile device user interface 402 previously used to display image 220.

At 400F of FIG. 4C, scenario 400 continues with the cache timer for IV1 expiring without additional reference being made to IV1. In response to the expiring timer, the ImageManager can reclaim the portion of unmanaged memory 480 used to store image 210—shown in FIG. 4C by clearing the words "Image 210" from the depiction of unmanaged memory 480. Additionally, a garbage collector can examine managed memory 404 to determine that IV1 is no longer being referenced and reclaim that memory, such as depicted in FIG. 4C by removing the "IV1" box from managed memory 404.

Figure 4D:
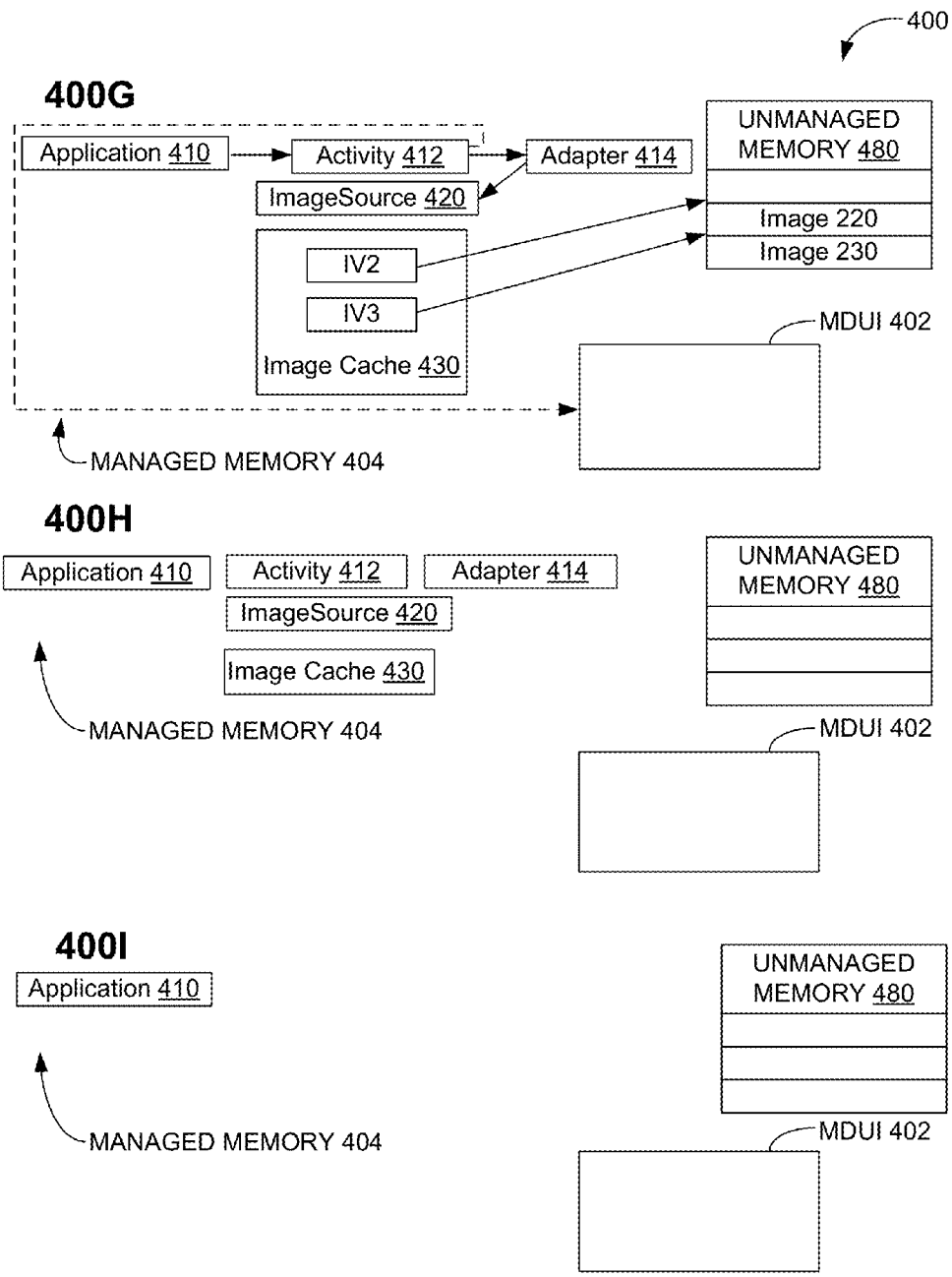

At 400G of FIG. 4D, scenario 400 continues with application 410 calling the stop( ) function of ImageSource 420 to terminate ImageSource 420. As part of the stop( ) function, ImageSource 420 can unbind images 220 and 230 and images 220 and 230 can be removed from display of mobile device user interface 402 provided by activity 412.

Also, as part of the stop( ) function, ImageSource 420 can request the ImageManager, not shown in FIGS. 4A-4D, to place IV2 and IV3 in ImageCache 430 for possible memory reclamation. In response, the ImageManager can place IV2 and IV3 in ImageCache 430 and start respectively cache timer for the two ImageValueTypes.

At 400H of FIG. 4D, scenario 400 continues with the cache timers for IV2 and IV3 expiring without additional references being made to IV2 and IV3. In response to the expiring timers, the ImageManager can reclaim the portion of unmanaged memory 480 used to store images 220 and 230—shown in FIG. 4D by removing the words "Image 220" and "Image 230." Additionally, a garbage collector can examine managed memory 404 to determine that each of IV2 and IV3 is no longer being referenced and reclaim the respective memory for the ImageValueTypes, such as depicted in FIG. 4C by removing the "IV2" and "IV3" labels from managed memory 404.

Also at 400H, application 410 can determine that activity 412 and all related objects are no longer needed. Thus, application 410 can request activity 412 and all related objects in managed memory 404 remove references to each other and then remove reference from application 410 to activity 412. Thus, as the objects for activity 412, adapter 414, ImageSource 420, and Image Cache 430 have no references, the garbage collector managing managed memory 404 can be permitted to reclaim these objects.

At block 400I of scenario 400, the garbage collector has reclaimed the objects for activity 412, adapter 414, ImageSource 420, and Image Cache 430, and scenario 400 ends. At the end of the scenario, only application 410 remains in managed memory 404. Also, by the end of scenario 400, no image data is displayed on mobile device user interface 402 or remains in unmanaged memory 480.

Example Data Network

Figure 5:
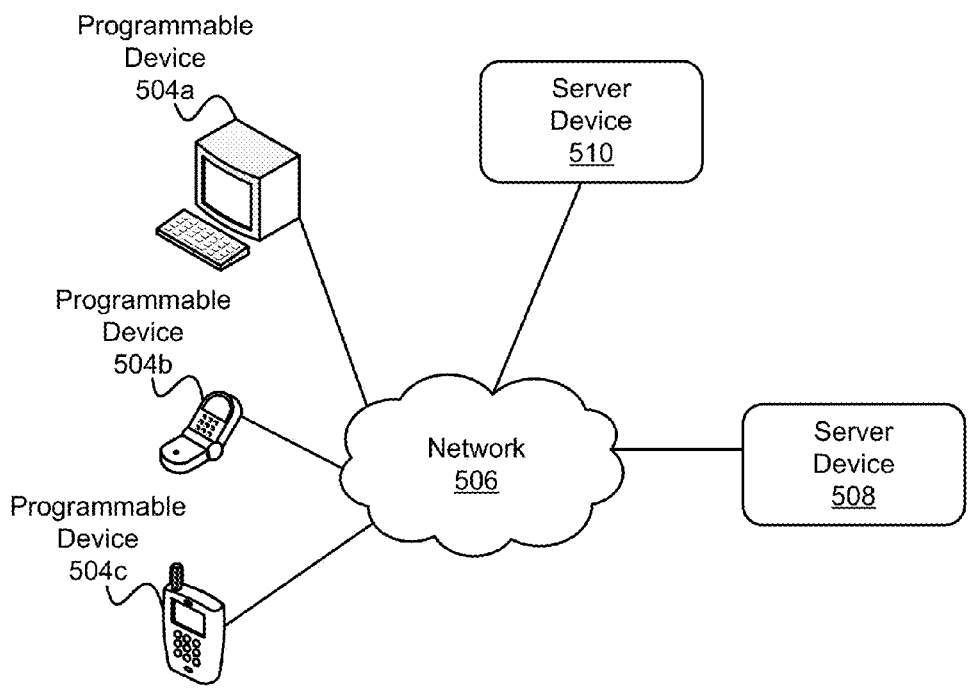
FIG. 5 depicts a distributed computing architecture in accordance with an example embodiment.

FIG. 5 shows server devices 508, 510 configured to communicate, via network 506, with programmable devices 504a, 504b, and 504c. Network 506 may correspond to a LAN, a wide area network (WAN), a corporate intranet, the public Internet, or any other type of network configured to provide a communications path between networked computing devices. The network 506 may also correspond to a combination of one or more LANs, WANs, corporate intranets, and/or the public Internet.

Although FIG. 5 only shows three programmable devices, distributed application architectures may serve tens, hundreds, or thousands of programmable devices. Moreover, programmable devices 504a, 504b, and 504c (or any additional programmable devices) may be any sort of computing device, such as an ordinary laptop computer, desktop computer, network terminal, wireless communication device (e.g., a cell phone or smart phone), and so on. In some embodiments, programmable devices 504a, 504b, and 504c may be dedicated to the design and use of software applications. In other embodiments, programmable devices 504a, 504b, and 504c may be general purpose computers that are configured to perform a number of tasks and need not be dedicated to software development tools.

Server devices 508, 510 can be configured to perform one or more services, as requested by programmable devices 504a, 504b, and/or 504c. For example, server device 508 and/or 510 can provide content to programmable devices 504a-504c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 508 and/or 510 can provide programmable devices 504a-504c with access to software for database, search, computation, graphical, audio, video, World Wide Web/Internet utilization, and/or other functions. Many other examples of server devices are possible as well.

Computing Device Architecture

Figure 6A:
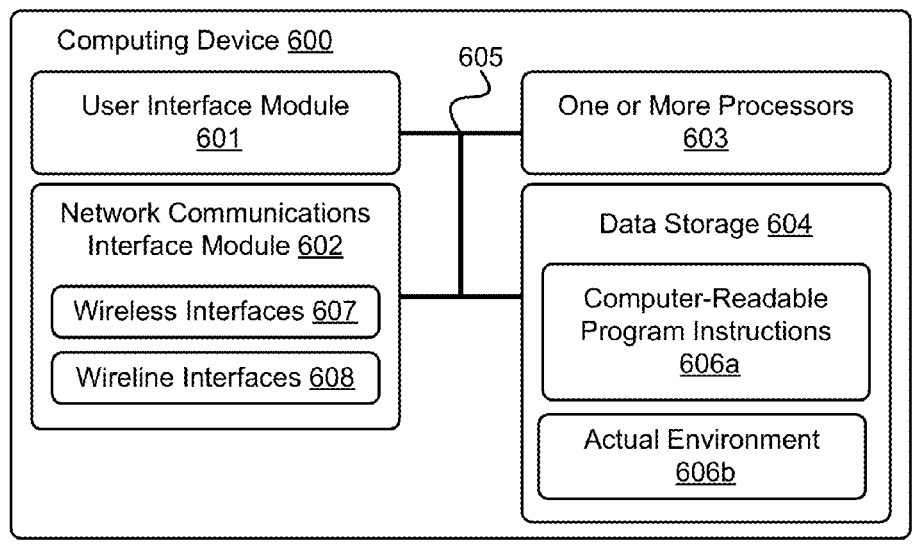
FIG. 6A is a block diagram of a computing device in accordance with an example embodiment.

FIG. 6A is a block diagram of a computing device (e.g., system) in accordance with an example embodiment. In particular, computing device 600 shown in FIG. 6A can be configured to perform one or more functions of server devices 508, 510, network 506, and/or one or more of programmable devices 504a, 504b, and 504c. Computing device 600 may include a user interface module 601, a network-communication interface module 602, one or more processors 603, and data storage 604, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a track ball, a joystick, a camera, a voice recognition module, and/or other similar devices. User interface module 601 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices.

Network-communications interface module 602 can include one or more wireless interfaces 607 and/or one or more wireline interfaces 608 that are configurable to communicate via a network, such as network 506 shown in FIG. 5. Wireless interfaces 607 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 603 can include one or more general purpose processors and/or one or more special purpose processors (e.g., digital signal processors, application specific integrated circuits, etc.). Processors 603 can be configured to execute computer-readable program instructions 606a that are contained in the data storage 604 and/or other instructions as described herein.

Data storage 604 can include one or more computer-readable storage media that can be read and/or accessed by at least one of processors 603. The one or more computer-readable storage media can include volatile and/or non-volatile storage components, such as optical, magnetic, organic or other memory or disc storage, which can be integrated in whole or in part with at least one of processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606a, actual environment 606b, and perhaps additional data. Actual environment 606b can store at least some of the data used by one or more processes and/or threads of a software application. In some embodiments, data storage 604 can additionally include storage required to perform at least part of the herein-described methods and techniques and/or at least part of the functionality of the herein-described devices and networks.

Cloud-Based Servers

Figure 6B:
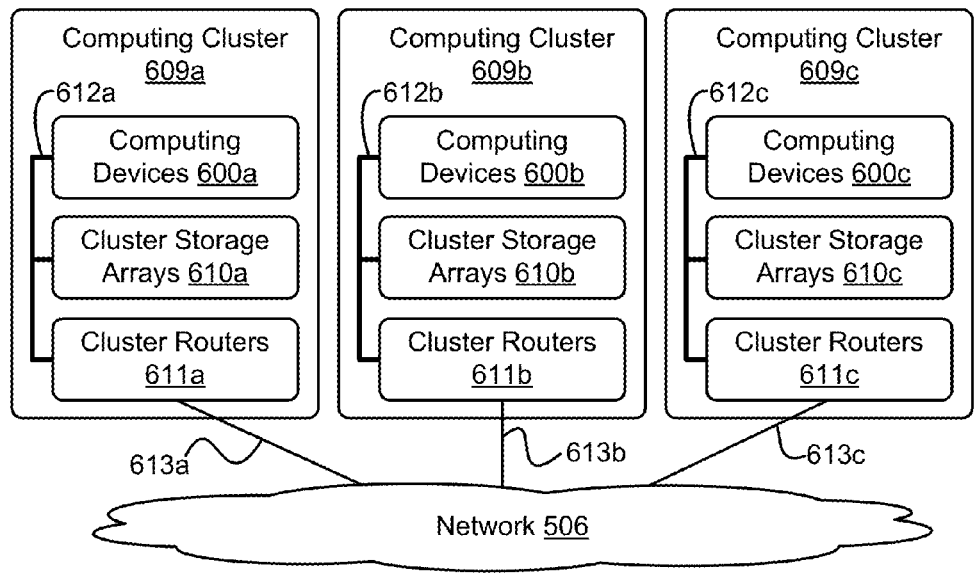
FIG. 6B depicts a cloud-based server system in accordance with an example embodiment.

FIG. 6B depicts a network 506 of computing clusters 609a, 609b, 609c arranged as a cloud-based server system in accordance with an example embodiment. Server devices 508 and/or 510 can be cloud-based devices that store program logic and/or data of cloud-based applications and/or services. In some embodiments, server devices 508 and/or 510 can be a single computing device residing in a single computing center. In other embodiments, server device 508 and/or 510 can include multiple computing devices in a single computing center, or even multiple computing devices located in multiple computing centers located in diverse geographic locations. For example, FIG. 5 depicts each of server devices 508 and 510 residing in different physical locations.

In some embodiments, data and services at server devices 508 and/or 510 can be encoded as computer-readable information stored in non-transitory, tangible computer-readable media (or computer-readable storage media) and accessible by programmable devices 504a, 504b, and 504c, and/or other computing devices. In some embodiments, data at server device 508 and/or 510 can be stored on a single disk drive or other computer-readable storage media, or can be implemented on multiple disk drives or other computer-readable storage media located at one or more diverse geographic locations.

FIG. 6B depicts a cloud-based server system in accordance with an example embodiment. In FIG. 6B, the functions of server device 508 and/or 510 can be distributed among three computing clusters 609a, 609b, and 608c. Computing cluster 609a can include one or more computing devices 600a, cluster storage arrays 610a, and cluster routers 611a connected by a local cluster network 612a. Similarly, computing cluster 609b can include one or more computing devices 600b, cluster storage arrays 610b, and cluster routers 611b connected by a local cluster network 612b. Likewise, computing cluster 609c can include one or more computing devices 600c, cluster storage arrays 610c, and cluster routers 611c connected by a local cluster network 612c.

In some embodiments, each of the computing clusters 609a, 609b, and 609c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609a, for example, computing devices 600a can be configured to perform various computing tasks of electronic communications server 512. In one embodiment, the various functionalities of electronic communications server 512 can be distributed among one or more of computing devices 600a, 600b, and 600c. Computing devices 600b and 600c in computing clusters 609b and 609c can be configured similarly to computing devices 600a in computing cluster 609a. On the other hand, in some embodiments, computing devices 600a, 600b, and 600c can be configured to perform different functions.

In some embodiments, computing tasks and stored data associated with server devices 508 and/or 510 can be distributed across computing devices 600a, 600b, and 600c based at least in part on the processing requirements of server devices 508 and/or 510, the processing capabilities of computing devices 600a, 600b, and 600c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 610a, 610b, and 610c of the computing clusters 609a, 609b, and 609c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 508 and/or 510 can be distributed across computing devices 600a, 600b, and 600c of computing clusters 609a, 609b, and 609c, various active portions and/or backup portions of these components can be distributed across cluster storage arrays 610a, 610b, and 610c. For example, some cluster storage arrays can be configured to store the data of server device 508, while other cluster storage arrays can store data of server device 510. Additionally, some cluster storage arrays can be configured to store backup versions of data stored in other cluster storage arrays.

The cluster routers 611a, 611b, and 611c in computing clusters 609a, 609b, and 609c can include networking equipment configured to provide internal and external communications for the computing clusters. For example, the cluster routers 611a in computing cluster 609a can include one or more internet switching and routing devices configured to provide (i) local area network communications between the computing devices 600a and the cluster storage arrays 601a via the local cluster network 612a, and (ii) wide area network communications between the computing cluster 609a and the computing clusters 609b and 609c via the wide area network connection 613a to network 506. Cluster routers 611b and 611c can include network equipment similar to the cluster routers 611a, and cluster routers 611b and 611c can perform similar networking functions for computing clusters 609b and 609b that cluster routers 611a perform for computing cluster 609a.

In some embodiments, the configuration of the cluster routers 611a, 611b, and 611c can be based at least in part on the data communication requirements of the computing devices and cluster storage arrays, the data communications capabilities of the network equipment in the cluster routers 611a, 611b, and 611c, the latency and throughput of local networks 612a, 612b, 612c, the latency, throughput, and cost of wide area network links 613a, 613b, and 613c, and/or other factors that can contribute to the cost, speed, fault-tolerance, resiliency, efficiency and/or other design goals of the moderation system architecture.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium such as a storage device including a disk or hard drive or other storage medium.

The computer-readable storage medium may also include non-transitory computer-readable storage media such as computer-readable storage media that stores data for short periods of time like register memory, processor cache, and random access memory (RAM). The computer-readable storage media may also include computer-readable storage media that stores program code and/or data for longer periods of time, such as secondary or persistent long term storage, like read only memory (ROM), optical or magnetic disks, compact-disc read only memory (CD-ROM), for example. The computer-readable storage media may also be any other volatile or non-volatile storage systems. A computer-readable medium may be considered a computer-readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    defining an image source of a computing device, wherein:
        the image source comprises one or more functions and at least a weak reference to one or more image views for an image object, the one or more functions comprising an unbind function, the image object comprises a reference to first storage of the computing device storing an image, the image source, the at least the weak reference to the one or more image views, and the image object are stored in a managed portion of memory of the computing device, the first storage is in an unmanaged portion of memory of the computing device, the managed portion differs from the unmanaged portion, wherein the managed portion of memory is managed by a garbage collector, and wherein the garbage collector is not configured to deallocate the first storage from the unmanaged portion of memory;
    displaying the image using the computing device;
    determining, using the computing device, whether to continue displaying the image; and
    upon determining to discontinue displaying the image:
        calling the unbind function of the image source for a given image view of the one or more image views, wherein the computing device:
            discontinues the display of the image,
            places the given image view into an image cache,
            starts a cache timer after placing the given image view into the image cache, determines whether the image is to be bound prior to expiration of the cache timer after a pre-determined period of time,
            in response to determining that the image is to be bound prior to the expiration of the cache timer, displays the image, and
            in response to determining that the image is not to be bound prior to the expiration of the cache timer, the image source deallocates the first storage by at least:
                after the unbind function is called, receiving an indication at the image source from the garbage collector that the given image view is solely weakly referenced,
                in response to receiving the indication that the given image view is solely weakly referenced, the image source initiating deallocation of the first storage, and
                after initiating deallocation of the first storage, the image source releasing a weak reference to the given image view.

2. The method of claim 1, wherein initiating deallocation of the first storage comprises invoking a recycle function of the image object.

3. The method of claim 1, wherein the unmanaged portion of memory is not configured to be managed by the garbage collector.

4. The method of claim 1, further comprising:
    determining, using the computing device, whether a second image is to be displayed; and
    upon determining that the second image is to be displayed:
        allocating second storage in the unmanaged portion of memory for the second image,
        storing the second image in the second storage,
        calling a bind function of the one or more functions for the image source for the second image, and
        the image source responsively displaying the second image.

5. The method of claim 4, wherein the one or more functions of the image source further comprise a preload function, and wherein the preload function is configured to allocate storage in the unmanaged portion of memory for at least the second image and to store the second image in the allocated storage.

6. The method of claim 4, further comprising:
    calling a stop function of the one or more functions for the image source;
    responsively unbinding an image view associated with the second image; and
    placing the unbound image view into the image cache.

7. The method of claim 6, further comprising:
    the computing device waiting for a second cache timer after placing the unbound image view e into the image cache;
    determining, prior to expiration of the second cache timer, whether the second image is to be displayed using the computing device;
    in response to determining that the second image is to be displayed, the computing device is configured for:
        retrieving the unbound image view from the image cache and displaying the second image, and
    in response to determining that the second image is not to be displayed, the computing device is configured for:
        deallocating the second storage.

8. A computing device, comprising:
    a processor; and
    data storage comprising a managed portion and an unmanaged portion, wherein the managed portion differs from the unmanaged portion, the data storage configured to store at least an image in a first storage and to store computer-readable program instructions, wherein the instructions are configured to, upon execution by the processor, cause the processor to perform functions comprising:
        defining an image source comprising one or more functions and a reference to one or more image views for an image object, the one or more functions comprising an unbind function, wherein the image object comprises a reference to the first storage, wherein the image source, the reference to the one or more image views, and the image object are stored in the managed portion, wherein the first storage is in the unmanaged portion, wherein the managed portion of memory is managed by a garbage collector, and wherein the garbage collector is not configured to deallocate the first storage from the unmanaged portion of memory;
        displaying the image,
        determining whether to continue displaying the image, and
        upon determining to discontinue displaying the image:
            calling the unbind function of the image source for a given image view of the one or more image views, wherein the computing device:
                discontinues the display of the image,
                places the given image view into an image cache,
                starts a cache timer after placing the given image view into the image cache, determines whether the image is to be bound prior to expiration of the cache timer after a pre-determined period of time, in response to determining that the image is to be bound prior to the expiration of the cache timer, displays the image, and in response to determining that the image is not to be bound prior to the expiration of the cache timer, the image source deallocates the first storage by at least:

after the unbind function is called, receiving an indication at the image source from the garbage collector that the given image view is solely weakly referenced, in response to receiving the indication that the given image view is solely weakly referenced, the image source initiating deallocation of the first storage, and after initiating deallocation of the first storage, the image source releasing a weak reference to the given image view.

9. The computing device of claim 8, wherein initiating deallocation of the first storage comprises invoking a recycle function of the image object.

10. The computing device of claim 8, wherein the unmanaged portion of memory is not configured to be managed by the garbage collector.

11. The computing device of claim 8, wherein the functions further comprise:

determining whether a second image is to be displayed;

upon determining that the second image is to be displayed:

allocating second storage in the unmanaged portion for the second image;

storing the second image in the second storage;

calling a bind function of the one or more functions for the image source for the second image, and the image source responsively displaying the second image.

12. The computing device of claim 11, wherein one or more functions of the image source further comprise a preload function, and wherein the preload function is configured to allocate storage in the unmanaged portion of memory for at least the second image and to store the second image in the allocated storage.

13. The computing device of claim 11, wherein the functions further comprise:

calling a stop function of the one or more functions for the image source;

responsively unbinding an image view associated with the second image; and placing the unbound image view into the image cache.

14. The computing device of claim 13, wherein the functions further comprise:

waiting for a second cache timer after placing the unbound image view into the image cache;

determining, prior to expiration of the second cache timer, whether the second image is to be displayed;

in response to determining that the second image is to be displayed:

retrieving the unbound image view from the image cache and displaying the second image; and in response to determining that the second image is not to be displayed:

deallocating the second storage.

15. An article of manufacture including a computer-readable storage medium having instructions stored thereon that, when executed by a processor, cause the processor to perform functions comprising:

defining an image source comprising one or more functions and a reference to one or more image views for an image object, the one or more functions comprising an unbind function, wherein the image object comprises a reference to first storage storing the image, wherein the image source, the reference to the one or more image views, and the image object are stored in a managed portion of data storage, wherein the first storage is stored in an unmanaged portion of the data storage, wherein the managed portion differs from the unmanaged portion, wherein the managed portion of memory is managed by garbage collector, and wherein the garbage collector is not configured to deallocate the first storage from the unmanaged portion of memory;

displaying the image;

determining whether to continue displaying the image; and upon determining to discontinue displaying the image:

calling the unbind function of the image source for a given image view of the one or more image views, wherein the computing device: discontinues the display of the image, places the given image view in an image cache, starts a cache timer after placing the given image view into the image cache, determines whether the image is to be bound prior to expiration of the cache timer after a pre-determined period of time, in response to determining that the image is to be bound prior to the expiration of the cache timer, displays the image, and in response to determining that the image is not to be bound prior to the expiration of the cache timer, the image source deallocates the first storage by at least:

after the unbind function is called, receiving an indication at the image source from the garbage collector that the given image view is solely weakly referenced, in response to receiving the indication that the given image view is solely weakly referenced, the image source initiating deallocation of the first storage, and after initiating deallocation of the first storage, the image source releasing a weak reference to the given image view.

16. The article of manufacture of claim 15, wherein initiating deallocation of the first storage comprises invoking a recycle function of the image object.

17. The article of manufacture of claim 15, wherein the unmanaged portion of memory is not configured to be managed by the garbage collector.

18. The article of manufacture of claim 15, wherein the functions further comprise:

determining whether a second image is to be displayed;

upon determining that the second image is to be displayed:

allocating second storage in the unmanaged portion for the second image, storing the second image in the second storage;

calling a bind function of the one or more functions for the image source for the second image, and the image source responsively displaying the second image.

19. The article of manufacture of claim 15, wherein one or more functions of the image source further comprise a preload function, and wherein the preload function is configured to allocate storage in the unmanaged portion of memory for at least the second image and to store the second image in the allocated storage.

20. The article of manufacture of claim 15, wherein the functions further comprise:
- calling a stop function of the one or more functions for the image source;
- responsively unbinding an image view associated with the second image; and
- placing the unbound image view into the image cache.

* * * * *